United States Patent [19]

Hori et al.

[11] Patent Number: 4,685,937

[45] Date of Patent: Aug. 11, 1987

[54] COMPOSITE ABRASIVE PARTICLES FOR MAGNETIC ABRASIVE POLISHING AND PROCESS FOR PREPARING THE SAME

[75] Inventors: Saburo Hori; Nobuhiro Watanabe, both of Iwaki, Japan

[73] Assignee: Kureha Chemical Industry Co., Ltd., Tokyo, Japan

[21] Appl. No.: 856,726

[22] Filed: Apr. 28, 1986

[30] Foreign Application Priority Data

Apr. 30, 1985 [JP] Japan .................................. 60-91197

[51] Int. Cl.⁴ .............................................. C09C 1/68
[52] U.S. Cl. ........................................ 51/309; 51/293
[58] Field of Search ................................... 51/293, 309

[56] References Cited

U.S. PATENT DOCUMENTS

| | | | |
|---|---|---|---|
| 4,021,263 | 5/1977 | Rosenblum | 51/309 |
| 4,118,459 | 10/1978 | Falkenhain | 51/293 |
| 4,217,113 | 8/1980 | Suh et al. | 51/309 |
| 4,229,214 | 10/1980 | Shushlebin et al. | 51/309 |
| 4,252,544 | 2/1981 | Takahashi | 51/309 |
| 4,280,935 | 7/1981 | Agiwara | 51/309 |
| 4,439,895 | 4/1984 | Richmond | 51/309 |

*Primary Examiner*—Paul Lieberman
*Assistant Examiner*—Willie J. Thompson
*Attorney, Agent, or Firm*—Flynn, Thiel, Boutell & Tanis

[57] ABSTRACT

Composite abrasive particles for use in magnetic abrasive polishing in which three phases of corundum-phase alumina, α-iron and iron-alumina spinel are detected by the powder X-ray diffractometry and which contains 48 wt % or more of iron and 11 wt % or more of aluminum. The composite abrasive particles are prepared by mixing starting materials of powders of aluminum and an iron oxide in such a ratio that three phases of corundum-phase alumina, α-iron and iron-alumina spinel may coexist and so that iron may be contained in an amount of 48 wt % or more and aluminum may be contained in an amount of 11 wt % or more, subjecting the materials to a solid-phase exothermic reaction, and breaking the resultant solid product.

5 Claims, 4 Drawing Figures

COMPOSITE ABRASIVE PARTICLES FOR MAGNETIC ABRASIVE POLISHING AND PROCESS FOR PREPARING THE SAME

BACKGROUND OF THE INVENTION

1. Field of the Invention

This invention relates to composite abrasive particles for use in magnetic abrasive polishing which effects deburring and/or surface finishing of machine parts and a process for preparing the same.

2. Prior Arts

Recently, a magnetic abrasive polishing has been developed and has attracted the attention of many researchers (for example, Takeo Shinmura, "Magnetic Abrasive Process," KINO ZAIRYO (Functions & Materials), Jan. 1985, pp.11-23 issued from K.K. CMC; Japan). According to this process, when the work and magnetic abrasive particles responsive to magnetism are dispqsed between magnetic poles, the magnetic abrasive particles are placed under restraint by a magnetic field. If the work is subjected to rotation or vibration when the abrasive particles are in this restraint, an abrasive effect is exerted like a brush. The magnetic abrasive particles used in this method must have both ferromagnetism and high hardness and they are usually a composite of iron and a material of high hardness such as aluminum oxide (alumina), titanium carbide, etc. As a process for preparing such composite particles, there have been known a process in which finely broken particles of iron and the materials of high hardness are sintered in a furnace after pressure molding or sintered while being hot pressed, a process in which a metallic alloy (for example, Al-Si-Fe) is internally nitrided, a process in which a carbide is produced from a melt of metallic alloy and carbon, a process in which a composite of titanium carbide and iron is prepared by utilizing an exothermic reaction between carbon and titanium (A. B. Lyashchenko et al., Poroshkovaya Metallurgiya 9 44–48 (1983)), or the like. In any process as described above, the produced composite material is subjected to breaking into an appropriate particle size to provide magnetic abrasive particles.

Among these processes, the process in which sintering is carried out after pressure molding and the process in which sintering is effected while being hot pressed may be called a sintering process. This sintering process needs an expensive sintering furnace and requires considerable troubles for breaking the composite prepared by the sintering process into a desired particle size. In the case of the composite which has been prepared at a relatively low temperature or within a relatively short period of time, the breaking into the desired particle size is not so difficult, but the bonding between iron and the material of high hardness is rather weak and iron and the material of high hardness are liable to be separated during the breaking process or within a short time after the composite has been started to be used in an abrasive polishing machine. Whereas, when the sintering is effected at a high temperature or for a long time, the grains of iron and the material of high hardness are consolidated and grow. In this case, the bonding between iron and the material of high hardness are strong and growth of the grains is also caused, so that the breaking is difficult and it is almost impossible to obtain finely broken particles.

The process employing the inner nitriding of metals or the process of preparing the abrasive particles from the melt needs expensive equipment and is rather poor in the yield. Thus, these processes are not economical. In addition, the breaking is extremely difficult and it is almost impossible to obtain finely broken particles as small as 44 μm or less.

SUMMARY OF THE INVENTION

The performance of magnetic abrasive particles may be evaluated by the abrasive ability, the surface finish performance and the life of the abrasive particles. There are no abrasive particles prepared by the conventional processes which can satisfy all these requirements for performance. Particularly, there have not heretofore been provided fine abrasive particles which can assure excellent surface finishing. It is therefore an object of the present invention, to provide abrasive particles suited for magnetic abrasive polishing which are excellent in all the required properties. The present invention has been achieved after intensive and extensive study on the abrasive particles as to what composition and what crystalline structure can meet the requirements and a method suitable for preparing such abrasive particles.

DETAILED DESCRIPTION OF THE INVENTION

Figure 1:
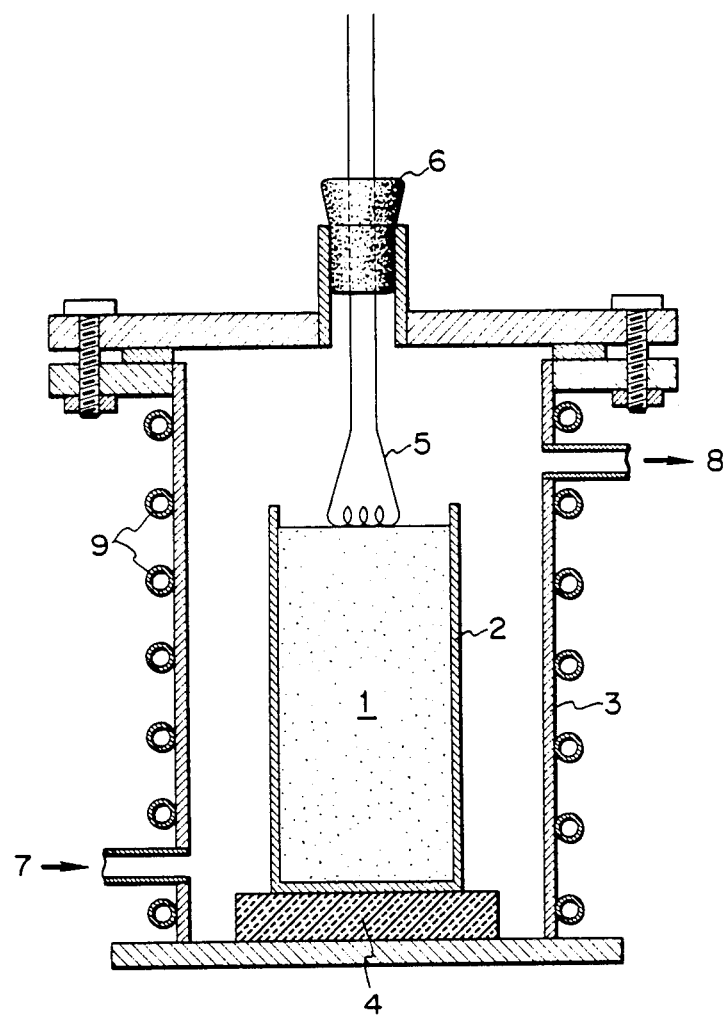
FIG. 1 is a sectional view of one form of an apparatus which is usable for preparing composite abrasive particles for magnetic abrasive polishing of the present invention by utilizing a solid-phase exothermic reaction.

The inventors of the present invention have studied composite abrasive particles formed of alumina and iron and found that composite abrasive particles composed of corundum alumina, α-iron and iron-alumina spinel are excellent in the duration of life and the particles of this type having a particle size of 44 μm or less have a remarkable performance in the surface finishing which have not heretofore been provided.

The present invention features composite abrasive particles for use in magnetic abrasion in which three phases of corundum-phase alumina, α-iron and iron-alumina spinel are detected by the powder X-ray diffractometry and which contains 48 wt % or more of iron and 11 wt % or more of aluminum.

The inventors' study on a process for preparing the composite abrasive particles having the crystalline structure as specified above have revealed that it is most preferred to utilize a solid-phase exothermic reaction. According to the method of utilizing a solid-phase exothermic reaction, it will suffice to mold a mixture of the raw material powders and only apply heat necessary to initiate the reaction at an end of the molded materials. The reaction then sequentially proceeds lamellarly so that there is no need to apply additional heat externally and the apparatus for preparing the composite abrasive particles may be simple. In addition, although the bonding between the product components can be strong, the product is porous and is relatively easy to break into a desired particle size. Thus, it can be said that this method is capable of providing an economical process for preparing abrasive particles of excellent performance.

The present invention, then, further features a process for preparing composite abrasive particles for use in magnetic abrasive polishing having three phases of corundum-phase alumina, α-iron and iron-alumina spinel detected by the powder X-ray diffractometry and containing iron in an amount of 48 wt % or more and aluminum in an amount of 11 wt % or more, which process is characterized in that the raw material powders of aluminum and an iron oxide are mixed in such a ratio that three phases of corundum-phase alumina, α-iron and iron-alumina spinel may coexist and so that iron may be contained in an amount of 48 wt % or more and aluminum may be contained in an amount of 11 wt % or more; the materials are molded or charged into a container with an end opened and heated, at an end thereof, in an atmosphere of an inert gas to initiate a solid-phase exothermic reaction and allow the reaction to sequentially proceed lamellarly by the reaction heat; and the resultant solid product is subjected to breaking.

Such abrasive particles having crystalline phases as described above may also be prepared by the sintering process if an iron oxide or iron-alumina spinel is added to iron and alumina. However, the experimental results have revealed that the abrasive particles prepared by the sintering process are inferior, in any of the abrasive ability, surface finishing performance and duration of life, as compared with the abrasive particles prepared by the solid-phase exothermic reaction process. This is because the iron-alumina spinel phase produced by the sintering process is not uniformly formed on the interface between the iron and the alumina and liable to be unevenly distributed due to slow material transfer of the iron-alumina spinel phase. To solve this problem, if the sintering is carried out at a high temperature or for a long time to accelerate the material transfer, the spinel phase can be formed on the interface between the iron and the alumina, but there is caused another problem that both the iron and the alumina are subject to remarkable grain growth and it becomes difficult to obtain grains of such an effective size of 250 μm or less and uniformly composed of iron and alumina.

When a solid-phase exothermic reaction is utilized, the ratio of iron oxide to aluminum is determined such that the iron oxide is in excess of a stoichiometrical reaction weight ratio. During the reaction, the reaction temperature reaches a temperature at which the iron is molten within a short period but the alumina is not molten, and in the meanwhile, an equilibrium condition is achieved and the iron oxide added in excess forms the iron-alumina spinel (FeAl$_2$O$_4$) on the interface between the iron and the alumina. The temperature is rapidly lowered to below the melting point of the iron after the reaction has been completed, so that macroscopic material transfer does not occur any more and the iron and the alumina are finely composed, while allowing the iron-alumina spinel to exist on the interface therebetween.

The thus obtained composite has strong bonding between iron and alumina and hardly causes separation of iron from alumina during the breaking process or in use.

Particulars of the process for preparing the composite abrasive particles of the present invention by utilizing a solid-phase exothermic reaction will now be described.

(Materials)

As starting materials for the preparation of the abrasive particles for use in magnetic abrasive polishing according to the present invention, there are used aluminum (Al) and an iron oxide (Fe$_2$O$_3$, Fe$_3$O$_4$ or FeO) for effecting a thermite reaction and powders of alumina (Al$_2$O$_3$) and iron (Fe) may be additionally used according to necessity for controlling a reaction temperature and/or adjusting the composition. As for the iron oxide, iron may alternatively be used after being partly oxidized.

The particle diameters of the materials are such that the particle diameter of the iron is 100 μm or less in average and preferably 20 μm or less. This is because it is necessary to suppress the particle diameter of the material below the particle size of the final abrasive particles which is 250 μm or less, or 44 μm or less in the case of the abrasive for surface finishing. As to the alumina used for the starting material, powders having an average particle size of 20 μm or less, preferably 8 μm or less are used. If alumina particles having a size larger than 20 μm are present, the surface finishing property of the produced abrasive is deteriorated and scratches may possibly be formed on the surface being finished. The abrasive or grinding ability of the abrasive particles is not influenced by the particle size of the alumina contained in the abrasive particles but it depends upon the size of composite particles containing iron, alumina and some iron-alumina spinel. For this reason, it is not necessary to make the particle size of alumina larger to increase the grinding ability.

As an iron oxide used as the starting material, ferric oxide (Fe$_2$O$_3$) of haematite crystalline type is most ordinarily used because it is reasonable in cost and easily available. However, ferric oxide of maghaematite type, triiron tetroxide (Fe$_3$O$_4$) of magnetite type or ferrous oxide (FeO) of wuestite type may also be employed alternatively. The particle size of the iron oxide is preferred to be sufficiently small, namely, as small as 5 μm or less so that alumina, iron and iron-alumina spinel are uniformly composed in the product. If the particles of the iron oxide are large, separation of iron from alumina may easily be caused within the product.

The particle size of the aluminum used as the starting material is not critical and not limited if it is not too large, because aluminum is molten during the reaction. In the experiments conducted by the inventors, aluminum having a particle size of 30 to 100 μm in average was employed, but the particle size of alumina is not limited to this range.

(Control of the Reaction Conditions)

A main reaction of the solid-phase exothermic reaction according to the present invention is so-called a thermite reaction and when the iron oxide used as the starting material is ferric oxide, it is expressed by:

$$Fe_2O_3 + 2Al \rightarrow Al_2O_3 + 2Fe$$

When ferric oxide or triiron tetroxide is present in excess, the iron oxide is not completely reduced to iron and partially reduced to ferrous oxide or iron-alumina spinel. These reactions are expressed as follows:

$$3Fe_2O_3 + 2Al \rightarrow Al_2O_3 + 6FeO$$

$$Al_2O_3 + FeO \rightarrow FeAl_2O_4$$

Figure 2:
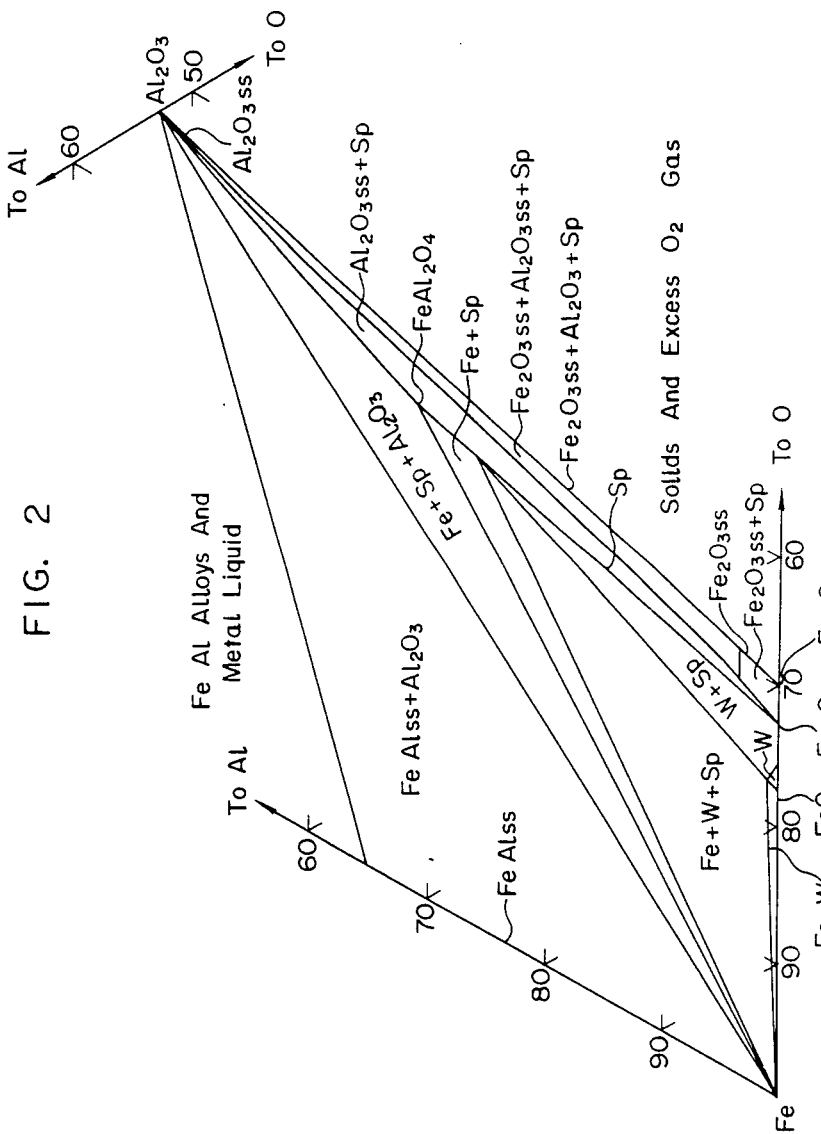
FIG. 2 is an equilibrium diagram of a system Fe-Al-O at 1000° C.

It has been found that according to the present invention, the crystalline phase of the final product establishes an equilibrium condition of the ternary system, Fe-Al-O. It is inferred that iron transforms from $\gamma$ to $\alpha$ in the course of cooling. FIG. 2 is a diagram of the equilibrium condition of the system Fe-Al-O at 1000° C. reported by Atlas et al. (J. Am. Ceram. Soc. 41 (5) 157 (1958)). In order to prepare the composite abrasive particles for magnetic abrasive polishing composed of three phases of Fe, $Al_2O_3$ and $FeAl_2O_4$, the composition of the starting materials should be adjusted so that it may be within a region where these three phases coexist. To select a range where $FeAl_2O_4$ exists in relatively large amount within the three-phase coexistent region, the amount of iron oxide, in relation with the ratio of the iron oxide and the aluminum of the starting materials, ought to be in excess of stoichiometrical amount for the thermite reaction. On the other hand, to select a range where Fe or $Al_2O_3$ is in relatively large amount within the three-phase coexistent region, the amount of Fe or $Al_2O_3$ which is preliminarily added for the purpose of composition adjustment or temperature control may be increased or decreased.

The reaction temperature can be calculated as an adiabatic reaction temperature from an exothermic heat of the solid-phase reaction and a specific heat of the product or a heat of fusion in the case where the product is fused. More particularly, the product is determined by the ratio of Fe, Al and O in the starting materials, a heat of reaction can be calculated from a difference in produced enthalpy between the starting materials and the product, and the heat of fusion and heat capacity of the product can be obtained. As a result, the reaction temperature can be calculated from the heat of reaction, heat of fusion and heat capacity.

It has been revealed that the reaction temperature is preferred to be within the range higher than a melting point of iron (1535° C.) and lower than the melting point of alumina (2015° C.). It is desirable that the reaction temperature be higher than the melting point of iron so that iron may be composed while incorporating alumina thereinto, but the higher the temperature, the more the separation of iron will occur. When the reaction temperature exceeds 2000° C. and alumina is molten, the separation of iron from alumina will be considerable. The temperature may be adjusted by the amount of iron and alumina which do not participate in the exothermic reaction but are used for dilution.

(Operation of Reactor)

FIG. 1 is a sectional view of one example of a reactor used for preparing the composite abrasive particles for magnetic abrasion by utilizing a solid-phase exothermic reaction.

After the powdery starting materials have been sufficiently uniformly mixed by a mixing machine, they are shaped into a form which is capable of easily propagating a solid-phase exothermic reaction lamellarly, for example, into a columnar shape, or charged in a container having such a shape. It is preferred to charge the powders in a container, particularly, in a paper cylinder, because of easiness of breaking after completion of the reaction.

The column prepared by charging the mixture 1 of the material powders in a paper cylinder is placed on an insulating brick 4 in a reactor 3 made of steel. A heater element 5 such as tungsten wire for ignition is fitted on the top portion of the column and then the reactor 3 is sealed by silicone rubber 6 etc. 7 is a gas inlet and 8 is a gas outlet. The air within the reactor 3 is fully purged by an inert gas such as nitrogen gas or purged into vacuum. Thereafter, the heater elememt 5 is energized to let a solid-phase exothermic reaction proceed from an end of the column. The propagation rate of the reaction is several centimeters per second. It is necessary to cool the outer wall of the reactor 3 so that it may not become too hot due to a reaction heat. For this reason, for example, the outer wall is wound by a copper pipe 9 and cooling water is let to flow therethrough. After the temperature has been sufficiently lowered after reaction, the product is taken out. The product is broken by a jaw crusher or a ball mill and then sieved to obtain the desired abrasive particles.

(Properties of the Abrasive Particles)

For analysis of the properties of the abrasive particles for magnetic abrasion, particle size distribution, tap density, chemical analysis, X-ray diffractometry, electron microscopic observation, etc. are necessary.

Since the particle size has a significant influence upon the abrasive ability and the surface finishing property, they may be classified into three size classes, e.g., over 105 to 250 $\mu$m, over 44 to 105 $\mu$m and 44 $\mu$m or less. The particle size of 44 $\mu$m is the smallest limit in usual dry sieving.

The chemical analysis is important to check as to whether a magnetic material composed of iron, a hard material composed of alumina and iron-alumina spinel are balanced in ratio or not. After careful study, it has been found that the total iron content (including iron which exists in the form of iron-alumina spinel) within the abrasive particles is preferred to be 48 wt % or more so that it can apply sufficient pressure in the magnetic field. Aluminum is present in the form of alumina or iron-alumina spinel and the minimum content thereof necessary for abrasive polishing is considered to be 5 to 10 wt %. However, there is a lower limit in the amount of aluminum to be used as the starting material to cause a solid-phase exothermic reaction. Due to this limitation, the aluminum content within the abrasive particles should be 11 wt % or more. When an oxygen content is too large, the corundum phase of alumina is not formed, causing the abrasive ability to be lowered, whereas when the oxygen content is too small, iron-alumina spinel phase is not formed, which lowers the bonding between the iron and alumina corundum phases, causing problems in the abrasive ability and duration of life. Therefore, the amount of oxygen is so selected that the desired three phase coexistent region may be formed.

Figure 3:
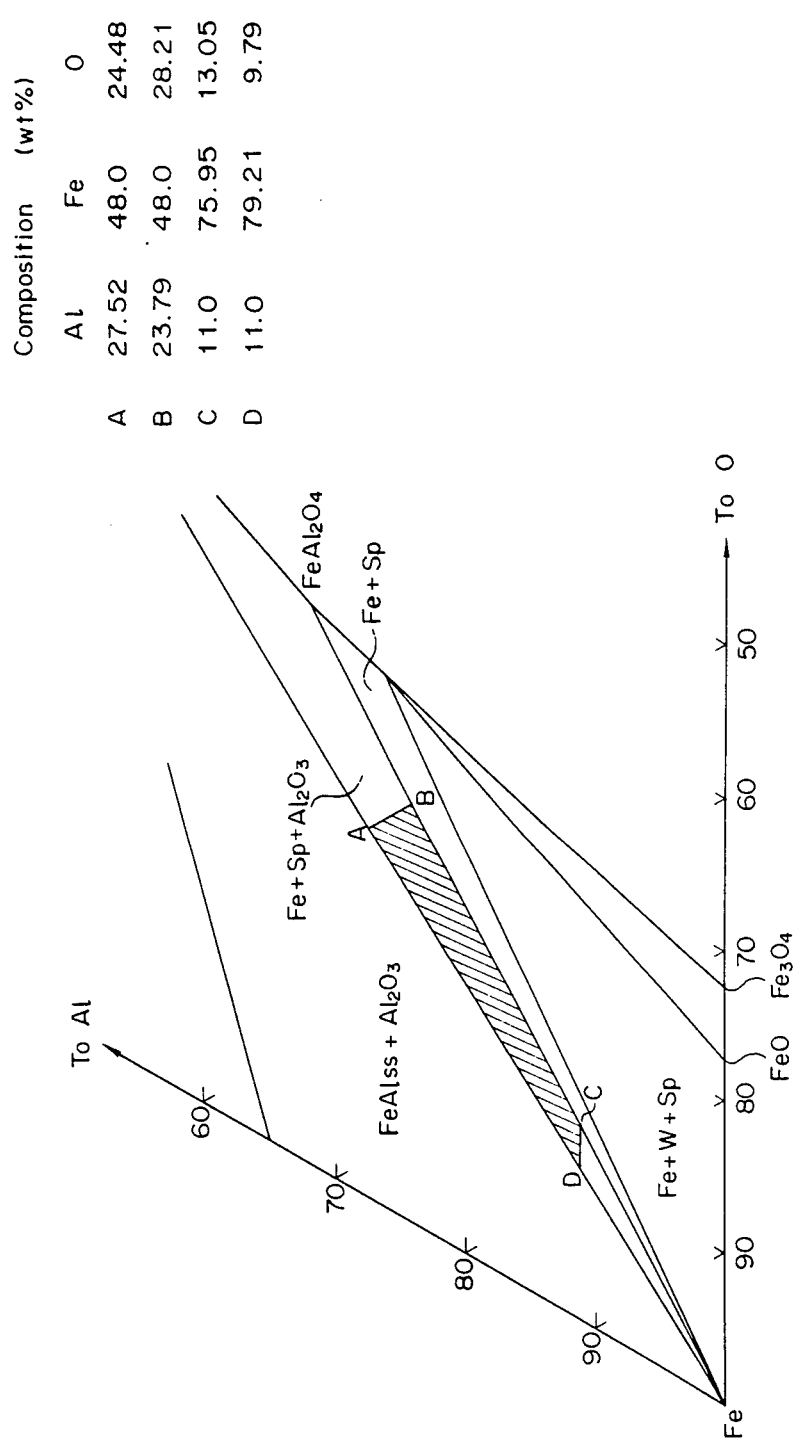
FIG. 3 is a diagram showing a compositional range of the composite abrasive particles having excellent performances according to the present invention.

The range of composition of the present invention which provides desired performances is a range crosshatched in FIG. 3. More specifically, the abrasive particles of the present invention have a composition within a quadrilateral formed by four points A, B, C and D in the equilibrium condition diagram of system Fe-Al-O. The points A, B, C and D are defined as follows:

A(Al: 27.52 wt %, Fe: 48.0 wt %, O: 24.48 wt %),
B(Al: 23.79 wt %, Fe: 48.0 wt %, O: 28.21 wt %),
C(Al: 11.0 wt %, Fe: 75.95 wt %, O: 13.05 wt %) and
D(Al: 11.0 wt %, Fe: 79.21 wt %, O: 9.79 wt %)

It can be confirmed by the X-ray diffractometry whether the crystalline phases expected from the result of the chemical analysis are actually present or not. In the abrasive particles prepared by the solid-phase exothermic reaction, the result of the chemical analysis, the crystalline phases expected from the equilibrium condition diagram of FIG. 2 and the result of the X-ray diffractometry agree very well, and a phase-equilibrium condition is achieved during the reaction. In contrast, it is proved by experiments that such equilibrium condition is not always achieved in the abrasive particles prepared by the sintering process.

The composite condition of iron, alumina and iron-alumina spinel can be observed by scanning electron microscopy. Iron and alumina can easily be distinguished from each other because reflections of electron rays differ very much between them, but discrimination between alumina and iron-alumina spinel is difficult. It is observed that iron assumes a nearly spherical shape and alumina is present in such a manner that it covers the iron. The iron-alumina spinel is considered to be present on the boundary between iron and alumina.

(Performance Evaluation of Abrasive Particles)

The performance of the abrasive particles for magnetic abrasive polishing is evaluated in respect of three properties, namely, abrasive ability, surface finishing performance and duration of life. The evaluation of the abrasive ability is made in terms of reduction in weight or reduction in size of a work material when the work material is subjected to abrasive polishing under given conditions. The surface finishing performance is evaluated by measuring the surface condition of the material after a polishing test conducted under given conditions.

A test for examining the abrasive ability and surface finishing performance of the abrasive particles of the invention was carried out by using, as a material to be ground, a carbon steel pipe of 30.4 mm in outer diameter and having a grinding length of 45 mm and by using, as a grinding machine, TMX101 type magnetic abrasive apparatus manufactured and sold by TOHBU M.X. Co., Ltd. The circumferential speed of rotation was 62 m/s and the magnetic flux density was 1.2 tesla. The test was carried out for 2 minutes. The abrasive ability was measured in the form of a ground amount of the material and the surface finishing performance was measured in the form of the maximum height $R_{max}$ of the surface roughness.

Since it is difficult to use an actual magnetic abrasive polishing apparatus to conduct a test for the duration of life, 200 g of abrasive particles were put in a small-sized stainless steel ball mill (inner diameter: 100 mm, length: 100 mm, balls: 10 mm in diameter, 30 pieces) and treated at a rotation rate of 120 rpm for 48 hours and then the decrease of the abrasive ability was measured.

(Effectiveness)

In the composite abrasive particles for magnetic abrasive polishing according to the present invention, since the iron-alumina spinel phase is present on the interface between the corundum-phase alumina and α-iron, the bonding between iron and alumina is strong and separation of iron from alumina is difficult to occur during the breaking process or in use in the abrasive polishing apparatus. Thus, the abrasive particles of the present invention are excellent in performances and long in life.

Especially, the abrasive particles prepared by utilizing a solid-phase exothermic reaction are cooled within a relatively short period of time after the phase-equilibrium has been established, so that the iron-alumina spinel phase is uniformly formed on the interface between iron and alumina and the iron and alumina are composed while they remain sufficiently small grains.

Therefore, even in the abrasive particles of a particle size of 44 μm or less, the desired three-phase composition is attained. This is especially desirable for surface finishing and such abrasive can realize surface finishing of the maximum height $R_{max}$ as low as 0.1 μm or less in terms of surface roughness of the material to be ground.

Whereas, it is rather difficult in the sintering process to attain a uniform composition as compared with the process utilizing a solid-phase exothermic reaction. However, it is also possible in the sintering process, to realize the desired three-phase coexistence in an abrasive having a relatively large particle size. Thus, the sintering process also can provide composite abrasive particles for magnetic abrasion of the present invention.

EXAMPLE 1

Figure 4:
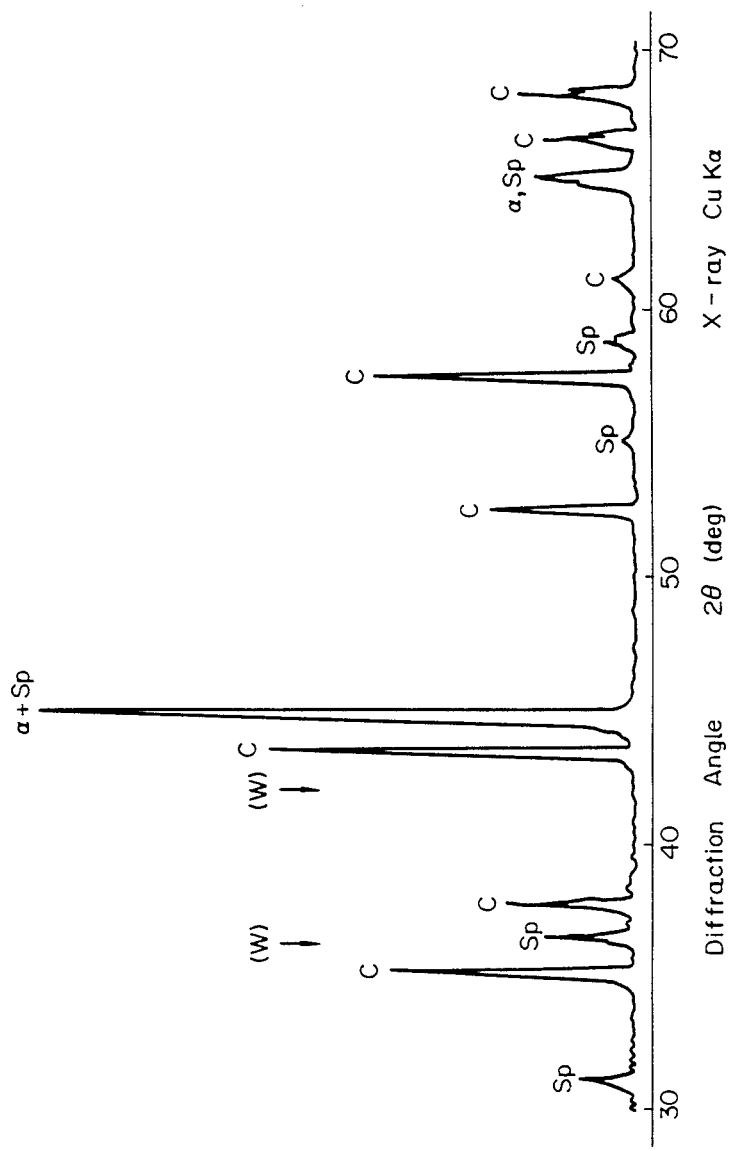
FIG. 4 is an X-ray diffraction pattern of the composite abrasive particles having a particle size of 44 μm or less obtained in Example 4.

528 G of aluminum powder (trade name: VA350, average particle diameter: 25–30 μm) manufactured and sold by Showa Denko K. K., 1688 g of synthetic haematite (average particle diameter: 1 μm) manufactured and sold by Kawatetsu Chemical Co., Ltd., 1420 g of electrolytic iron (trade name: AFP25M, average particle diameter: 10 μm) manufactured and sold by Showa Denko K. K. and 364 g of alumina (trade name: A24-2, average particle diameter: 4 μm) manufactured and sold by Showa Keikinzoku K. K. were mixed and then charged in a paper cylinder having a diameter of 100 mm and a height of 300 mm. The so charged paper cylinder was placed in an apparatus as illustrated in FIG. 1 so as to cause a reaction in an atmosphere of N2 at normal pressure. The calculated ratio by weight of Al-Fe-O was 18.0:65.0:17.0 and the calculated reaction temperature was 1824° C. The reaction product was broken by a jaw crusher and a ball mill to obtain abrasive particles of three different particle sizes, over 105 to 250 μm, over 44 to 105 μm and 44 μm or less. X-ray diffractometry revealed that all these abrasive particles contain three phases of α-iron, corundum-phase alumina and iron-alumina spinel. FIG. 4 exemplarily shows an X-ray diffraction pattern of the abrasive particles having a particle size of 44 μm or less.

The abrasive polishing test was conducted under the conditions as specified before. The abrasive particles having a particle size of over 105 to 250 μm showed a ground amount of 375 mg and a surface roughness (maximum height) $R_{max}$ of 0.6 μm, the abrasive particles having a particle size of over 44 to 105 μm showed a ground amount of 170 mg and a surface roughness $R_{max}$ of 0.25 μm and the abrasive particles having a particle size of 44 μm or less showed a ground amount of 54 mg and a surface roughness $R_{max}$ of 0.08 μm.

EXAMPLE 2

528 G of aluminum, 1980 g of haematite (ferric oxide), 1144 g of iron and 348 g of alumina, the same as those used in Example 1, were mixed and reacted in a manner similar to that of Example 1. The ratio by weight of Al-Fe-O was calculated as 17.8:63.2:19.0 and the reaction temperature was calculated as 1763° C. Three phases were also detected by the X-ray diffractometry, but the peak of the corundum-phase alumina was slightly lower and the peak of the iron-alumina spinel phase was higher as compared with those of Example 1. The ground amount by the abrasive particles having a particle size of over 105 to 250 μm was 283 mg and $R_{max}$ thereof was 0.5 μm, and the ground amount by the abrasive particles having a particle size of 44 μm or less was 37 mg and $R_{max}$ was 0.06 μm. After the abrasive particles having a particle size of over 105 to 250 μm had been treated by a ball mill for 48 hours according to the life test as specified before and subjected to a similar grinding test, there was caused little change in the ground amount and $R_{max}$. They were 244 mg and 0.5 μm, respectively.

EXAMPLE 3

528 G of aluminum, 1728 g of haematite, 816 g of iron and 28 g of alumina, the same as those of Example 1, were mixed and reacted similarly. The ratio by weight of Al-Fe-O was calculated as 25.5:50.6:23.9 and the reaction temperature was calculated as 1724° C. The chemical analysis conducted for the abrasive particles having respective particle size ranges revealed that the analysis results were not significantly different from the calculated values. The coexistence of the three phases was observed by the X-ray diffractometry, but the peak of iron was rather low. The ground amount by the abrasive particles of over 105 to 250 μm particle size was 292 mg and $R_{max}$ thereof was 0.9 μm and the ground amount by the abrasive particles having a particle size of 44 μm or less was 43 mg and $R_{max}$ thereof was 0.10 μm.

EXAMPLE 4

460 G of aluminum, 1460 g of haematite and 2080 g of iron, which were the same as those of Example 1, were mixed without adding alumina and reacted similarly. The ratio by weight of Al-Fe-O was calculated as 11.5:77.5:11.0 and the reaction temperature was calculated as 1658° C.

The coexistence of the three phases was confirmed by the X-ray diffractometry. The ground amount by the abrasive particles having a particle size of over 105 to 250 μm was 331 mg and $R_{max}$ thereof was 0.7 μm and the ground amount by the abrasive particles having a particle size of 44 μm or less was 58 mg and $R_{max}$ thereof was 0.08 μm.

EXAMPLE 5

564 G of aluminum powder (trade name: VA350) manufactured and sold by Showa Denko K. K., 3224 g of atomized iron (trade name: KIP - SZ, average particle diameter: about 25 μm) manufactured and sold by Kawasaki Steel Corporation and 212 g of alumina (trade name: WA#2000, average particle diameter: 8 μm) were used as starting materials. Although an iron oxide material was not used, the atomized iron was considerably oxidized and contained 17.0 wt % of oxygen which was sufficient to cause a solid-phase exothermic reaction with aluminum. The ratio by weight of Al-Fe-O was calculated as 16.9:66.9:16.2 and the reaction temperature was calculated as 1963° C. In the breaking of the product, the yield of the effective abrasive particles having a particle size of 250 μm or less was as high as 95% which is much higher as compared with the foregoing Examples wherein the yields were 80 to 90%.

The result of the grinding test revealed that the ground amount by the particles having a particle size of over 105 to 250 μm was 366 mg and $R_{max}$ thereof was 0.7 μm and the ground amount by the particles having a particle size of 44 μm or less was 67 mg and $R_{max}$ thereof was 0.06 μm.

EXAMPLE 6

Aluminum, an iron oxide and iron, the same as those of Example 1, and alumina (trade name: WA#2000) manufactured and sold by Showa Denko K. K. were used. 460 g of aluminum, 1472 g of iron oxide (haematite), 1528 g of iron and 1080 g of alumina were mixed and reacted. The ratio by weight of Al-Fe-O was calculated as 18.6:63.9:17.4 and the reaction temperature was calculated as 1573° C. The desired three phases were detected by the X-ray diffractometry.

The results of the grinding test were such that the ground amount by the abrasive particles having a particle size of over 105 to 250 μm was 288 mg and $R_{max}$ thereof was 0.8 μm and the ground amount by the particles having a particle size of 44 μm or less was 48 mg and $R_{max}$ thereof was 0.06 μm.

EXAMPLE 7

Aluminum and iron, which were the same as those of Example 1, alumina (trade name: WA#2000) manufactured and sold by Showa Denko K. K. and triiron tetroxide (trade name: TB - W, average particle diameter: 0.6 μm) manufactured and sold by Tone Sangyo K. K. were used. 536 G of aluminum, 2056 g of triiron tetroxide, 1060 g of iron and 348 g of alumina were mixed and reacted similarly. The ratio by weight of Al-Fe-O was calculated as 18.0:63.7:8.3 and the reaction temperature was calculated as 1812° C. A desired three phases were detected by the X-ray diffractometry. The result of the grinding test showed that the ground amount by the abrasive particles having a particle size of over 105 to 250 μm was 321 mg and $R_{max}$ thereof was 0.8 μm and the ground amount by the particles having a particle size of 44 μm or less was 58 mg and $R_{max}$ thereof was 0.07 μm.

EXAMPLE 8

Of the materials used in Example 1, 34.2 g of iron oxide, 362.4 g of iron and 203.4 g of alumina were mixed and molded by the isotactic press method under pressure of 3 ton/cm$^2$ and then sintered in an atmosphere of argon at a maximum temperature of 1250° C. for 1 hour. The composition of Al-Fe-O was calculated by weight as 17.9:64.4:17.7. In crystalline phases of the sintered product, not only α-iron, corundum-phase alumina and iron-alumina spinel but also ferrous oxide wuestite phase were detected and phase equilibrium was not achieved. Although the breaking of the product was considerably difficult, three kinds of abrasive particles having a particle size of over 105 to 250 μm, over 44 to 105 μm and 44 μm or less were prepared and subjected to a chemical analysis. The Fe contents were 67 wt % in the particles having a size of over 105 to 250 μm, 51 wt % in the particles having a size of over 44 to 105 μm and 33 wt % in the particles having a size of 44 μm or less. Thus, the iron content was much reduced in the smaller particles, which shows that desired bonding was not effected.

The results of the grinding test were such that the ground amount by the abrasive particles having a size of over 105 to 250 μm was 238 mg and $R_{max}$ thereof was 1.0 μm, the ground amount by the particles having a size of over 44 to 105 μm was 77 mg and $R_{max}$ thereof was 0.2 μm and the ground amount by the particles having a size of 44 μm or less was 5 mg and $R_{max}$ was 0.15 μm. Thus, the performances were deteriorated as the particle size was reduced as compared with the case where a solid-phase exothermic reaction was employed. The abrasive particles having a relatively large particle size are usable. But, when the life test as specified before was conducted, the reduction of the ground amount was remarkable as compared with the case of solid-phase exothermic reaction process. In this respect, the solid-phase exothermic reaction process is preferred.

COMPARATIVE EXAMPLE 1

The same materials as in Example 1 were used. 516 G of aluminum, 1520 g of iron oxide (haematite), 1560 g of iron and 404 g of alumina were mixed and reacted similarly. The reaction temperature was calculated as 1807° C. The ratio by weight of Al-Fe-O was 18.2:65.6:16.2. The desired coexistence of the three phases was not attained and the iron-alumina spinel phase did not exist. It was inferred that there was formed a coexistence region of two phases of α-iron in which slight aluminum formed a solid solution and corundum-phase alumina. Actually, no phases other than these two phases were detected by the X-ray diffractometry. The grinding test of the abrasive particles obtained by breaking the reaction product revealed that the ground amount by the abrasive particles having a particle size of over 105 to 250 μm was 177 mg and $R_{max}$ thereof was 0.8 μm and the ground amount by the abrasive particles having a particle size of 44 μm or less was 27 mg and $R_{max}$ thereof was 0.2 μm. Thus, the ground amounts were very low and especially the surface finish by the abrasive particles having a particle size of 44 μm was not good.

When the abrasive particles having a particle size of over 105 to 250 μm were treated by a ball mill according to the life test as specified before and subjected to a grinding test, the results were such that the ground amount was 93 mg and $R_{max}$ was 0.7 μm. Thus, the ground amount was remarkably reduced. This is inferred that since there exists no iron-alumina spinel phase, the bonding between the iron and the corundum-phase alumina was weak and separation of the iron from the corundum-phase alumina occurred after the life test. Even before the life test, slight separation was caused during the breaking process, so that it is considered that the abrasive ability is rather poor as compared with the abrasive particles containing the iron-alumina spinel phase.

COMPARATIVE EXAMPLE 2

The same materials as in Example 1 were used. 516 G of aluminum, 2192 g of iron oxide, 1044 g of iron and 248 g of alumina were mixed and reacted. The ratio of Al-Fe-O by weight and the reaction temperature were calculated as 16.2:64.4:19.4 and 1692° C., respectively.

From this composition, it is inferred that the corundum phase did not exist and two phases of iron and iron-alumina spinel were produced and it is further inferred that the alumina of the iron-alumina spinel was partly replaced by iron. This was confirmed by the X-ray diffractometry.

The ground amount by the abrasive particles having a particle size of over 105 to 250 μm obtained by breaking was 151 mg and $R_{max}$ thereof was 0.8 μm and the ground amount by the abrasive particles having a particle size of 44 μm or less was 21 mg and $R_{max}$ thereof was 0.2 μm. Thus, the grinding abilities were insufficient and the surface finish of the abrasive particles of a particle size of 44 μm or less was poor.

COMPARATIVE EXAMPLE 3

The same materials as in Example 1 were used. 528 G of aluminum, 1648 g of iron oxide (haematite), 652 g of iron and 1172 g of alumina were mixed and reacted. As a result of calculation, the ratio by weight of Al-Fe-O was 28.7:45.1:26.2 and the reaction temperature was 1703° C. When the abrasive particles obtained after breaking were subjected to the X-ray diffractometry, three phases of α-iron, corundum-phase alumina and iron-alumina spinel were detected, but the peak of the corundum phase was extremely high and the peak of iron was low. As a result of the grinding test, the ground amount by the abrasive particles of over 105 to 250 μm was 167 mg and $R_{max}$ thereof was 0.7 μm and the ground amount by the abrasive particles of 44 μm or less was 27 mg and $R_{max}$ thereof was 0.15 μm. Thus, the grinding abilities were insufficient and the surface finish by the abrasive particles of 44 or less was poor.

COMPARATIVE EXAMPLE 4

The same materials as in Example 1 were used. 408 G of aluminum, 1360 g of iron oxide (haematite) and 2232 g of iron were mixed. No alumina was added. The ratio by weight of Al-Fe-O was calculated as 10.2:79.6:10.2. The materials were let to be reacted, but the reaction occurred only at a restricted portion in contact with an ignition coil and it was not propagated. It is inferred from the calculated reaction temperature which was lower than a melting point of iron that the reaction temperature was too low to propagate the reaction.

The results of the foregoing Examples and Comparative Examples are summarized in Tables 1 and 2. As apparent from Table 2, among the abrasive particles of the present invention, those having a particle size as large as over 105 to 250 μm show a large ground amount and are suitable for use in which surface removal and deburring are required, whereas those having a particle size of 44 μm or less which have been prepared by the solid-phase exothermic reaction method (Examples 1 to 7) show extremely low surface roughness and are suitable for use in which elaborate surface finish is required.

TABLE 1

| | | Starting Materials, g | | | | | Component Ratio, wt % | | | React. Temp., °C. | Crystalline Phase |
|---|---|---|---|---|---|---|---|---|---|---|---|
| | | Al | Fe$_2$O$_3$ | Fe$_3$O$_4$ | Fe | Al$_2$O$_3$ | Al | Fe | O | | |
| Examples | 1 | 528 | 1688 | | 1420 | 364 | 18.0 | 65.0 | 17.0 | 1824 | C, α, sp |
| | 2 | 528 | 1980 | | 1144 | 348 | 17.8 | 63.2 | 19.0 | 1763 | C, α, sp |
| | 3 | 528 | 1728 | | 816 | 928 | 25.5 | 50.6 | 23.9 | 1724 | C, α, sp |
| | 4 | 460 | 1460 | | 2080 | | 11.5 | 77.5 | 11.0 | 1658 | C, α, sp |
| | 5 | 564 | | | (3224)* | 212 | 16.9 | 66.9 | 16.2 | 1963 | C, α, sp |
| | 6 | 460 | 1472 | | 1528 | 1080 | 18.6 | 63.9 | 17.4 | 1573 | C, α, sp |
| | 7 | 536 | | 2056 | 1060 | 348 | 18.0 | 63.7 | 18.3 | 1812 | C, α, sp |
| | 8 | | 34.2 | | 362.4 | 203.4 | 17.9 | 64.4 | 17.7 | 1250** | C, α, sp, w |
| Comparative Examples | 1 | 516 | 1520 | | 1560 | 404 | 18.2 | 65.6 | 16.2 | 1807 | C, α |
| | 2 | 516 | 2192 | | 1044 | 248 | 16.2 | 64.4 | 19.4 | 1692 | α, sp |
| | 3 | 528 | 1648 | | 652 | 1172 | 28.7 | 45.1 | 26.2 | 1703 | C, α, sp |

TABLE 1-continued

| | | Starting Materials, g | | | | Component Ratio, wt % | | | React. Temp., °C. | Crystalline Phase |
|---|---|---|---|---|---|---|---|---|---|---|
| | Al | Fe$_2$O$_3$ | Fe$_3$O$_4$ | Fe | Al$_2$O$_3$ | Al | Fe | O | | |
| 4 | 408 | 1360 | | 2232 | | 10.2 | 79.6 | 10.2 | <1535 | not reacted |

*iron powder containing 17.0 wt % of oxygen
Crystalline Phase C: corundum-phase alumina
sp: iron-alumina spinel
**sintering temperature
: α-iron
w: wuestite

TABLE 2

| | | Particle size over 105–250 μm | | Particle size over 44–105 μm | | Particle size 44 μm or less | |
|---|---|---|---|---|---|---|---|
| | | Ground amount, mg | R$_{max}$, μm | Ground amount, mg | R$_{max}$, μm | Ground amount, mg | R$_{max}$, μm |
| Examples | 1 | 375 | 0.6 | 170 | 0.25 | 54 | 0.08 |
| | 2 | 283(244) | 0.5(0.5) | | | 37 | 0.06 |
| | 3 | 292 | 0.9 | | | 43 | 0.10 |
| | 4 | 331 | 0.7 | | | 58 | 0.08 |
| | 5 | 366 | 0.7 | | | 67 | 0.06 |
| | 6 | 288 | 0.8 | | | 48 | 0.06 |
| | 7 | 321 | 0.8 | 163 | 0.2 | 58 | 0.07 |
| | 8 | 238 | 1.0 | 77 | 0.2 | 5 | 0.15 |
| Comparative Example | 1 | 177(93) | 0.8(0.7) | | | 27 | 0.2 |
| | 2 | 151 | 0.8 | | | 21 | 0.2 |
| | 3 | 167 | 0.7 | | | 27 | 0.15 |
| | 4 | Abrasive particles can not be produced. | | | | | |

( ) is a value after life test.

Since the composite abrasive particles for use in magnetic abrasive polishing according to the present invention have effects as described above, they contribute to the improvement of the efficiency and economy of the magnetic abrasive polishing. They enables automatic deburring or surface finishing by the magnetic abrasive polishing for machine parts such as a frame of a watch, a part of a sewing machine, a ball valve, a shaft for a control valve, etc. which have heretofore been deburred or applied with surface finishing manually.

We claim:

1. Composite abrasive particles for use in magnetic abrasive polishing in which three phases of corundum-phase alumina, α-iron and iron-alumina spinel are detected by the powder X-ray diffractometry and which contain 48 wt % or more of iron and 11 wt % or more of aluminum.

2. Composite abrasive particles for use in magnetic abrasive polishing as claimed in claim 1, wherein said abrasive particles have a particle diameter of 44 μm or less.

3. A process for preparing composite abrasive particles for use in magnetic abrasive polishing having three phases of corundum-phase alumina, α-iron and iron-alumina spinel detected by the powder X-ray diffractometry and containing iron in an amount of 48 wt % or more and aluminum in an amount of 11 wt % or more, which process is characterized in that starting materials of powders of aluminum and an iron oxide are mixed in such a ratio that three phases of corundum-phase alumina, α-iron and iron-alumina spinel may coexist and so that iron may be contained in an amount of 48 wt % or more and aluminum may be contained in an amount of 11 wt % or more; the materials are molded or charged into a container with an end opened and heated, at an end thereof, in an atmosphere of an inert gas to initiate a solid-phase exothermic reaction and allow the reaction to sequentially proceed lamellarly by the reaction heat; and the resultant solid product is subjected to breaking.

4. A process for preparing composite abrasive particles as claimed in claim 3, wherein the materials are added with powders of iron and/or aluminum oxide to adjust the composition or control the reaction temperature.

5. A process for preparing composite abrasive particles as claimed in claim 3, wherein the reaction temperature of the solid-phase exothermic reaction is higher than a melting point of iron and lower than a melting point of alumina.

* * * * *

UNITED STATES PATENT AND TRADEMARK OFFICE
CERTIFICATE OF CORRECTION

PATENT NO. : 4 685 937
DATED : August 11, 1987
INVENTOR(S) : Saboru HORI et al

It is certified that error appears in the above-identified patent and that said Letters Patent is hereby corrected as shown below:

Column 1, line 20; change "dispqsed" to ---disposed---.
Column 4, line 51; change "alumina" to ---aluminum---.
Column 5, line 38; change "a melting" to ---the melting---.
Column 9, line 10; change "28 g" to ---928 g---.
Columns 13 and 14, in the footnotes to Table 1;
    ": α-iron" should read ---α:α-iron---.

Signed and Sealed this

Seventh Day of June, 1988

Attest:

DONALD J. QUIGG

Attesting Officer

Commissioner of Patents and Trademarks